2,758,115
DERIVATIVES OF THIOPHOSPHORIC ACID

Walter Lorenz, Wuppertal-Elberfeld, Germany, assignor to Farbenfabriken Bayer Aktiengesellschaft, Leverkusen, Germany, a corporation of Germany No Drawing. Application February 10, 1955,
Serial No. 487,458

7 Claims. (Cl. 260—248)

The present invention relates to new derivatives of thiophosphoric acid and to a process of making the same; more particularly the invention is concerned with compounds of the general formula

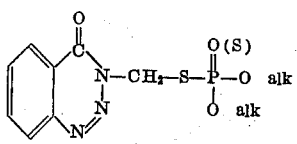

in which alk stands for alkyl.

The new compounds can be obtained by reacting N-halogenomethyl-benzazimides, which may be substituted in the benzene nucleus with the salts of dialkylthio-phosphoric acids and dialkyldithio-phosphoric acids.

The reaction is preferably carried out in an inert diluent. Suitable diluents according to the invention are especially ketones but alcohols or other solvents such as benzene or toluene may also be employed.

Due to the high reactivity of N-halogenomethylbenzazimides the reaction starts already at room temperature; it is advantageous, however, to complete the reaction at slightly elevated temperatures. In the case of N-chloromethylbenzazimide and the sodium salt of diethyldithiophosphoric acid the reaction proceeds according to the following equation:

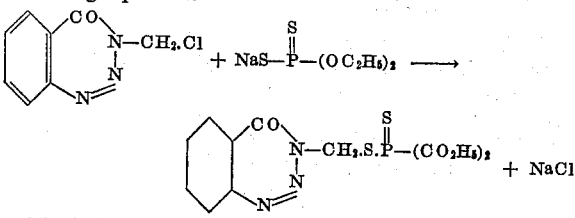

The N-halogenomethylbenzazimides employed as starting products for the process of the invention are obtainable from the corresponding methylol compounds with the aid of halogenating agents in known manner.

The compounds obtained according to the invention are either solid, crystalline substances having a low melting point or non-distillable, water-insoluble oils.

The new compounds obtained in accordance with the invention are highly effective against sucking and chewing insects, especially against spider mites. Thus, e. g. O,O-diethyl-S-(benzaziminomethyl)-dithiophosphate kills the red mite completely in a concentration of 0.001%. The new compounds are, therefore, very valuable plant protecting agents.

In the following some reactions are described by way of example to illustrate the method of preparing N-methylol-benzazimide and, therefrom, N-halogenomethyl-benzazimides which are used as starting material to obtain the insecticidal compounds contemplated by the invention.

PREPARATION A.—N-METHYLOLBENZAZIMIDE (N-HYDROXYMETHYL-BENZAZIMIDE)

250 grams of benzazimide are slightly heated with 1.6 liters of 30% formaldehyde and 300 ml. of water while stirring on the water bath for 15 minutes. The mixture solidifies to a viscous paste. By filtering the paste with suction the methylol compound is obtained in almost colorless needles. M. P.: 134–135° C.; yield: 277–300 grams, i. e. 92–100% of the theoretical.

Alternatively, the methylol compound can be obtained by dissolving the benzazimide, which is still wet from its manufacture, with twice the quantity of a 30% formaldehyde solution and eight times the quantity of water on the water bath, filtering the solution with some charcoal and allowing the solution to cool. The yield of N-hydroxymethyl-benzazimide is almost quantitative.

PREPARATION B.—N-CHLOROMETHYL-BENZAZIMIDE 700 grams (4 mols) of dry N-hydroxymethyl-benzazimide are suspended in 1.5–2 liters of chloroform. 1.8 mols (about 130 ml.) of thionylchloride are added rapidly, the temperature rising to 35° C. Another quantity of thionylchloride, 3.8 mols (about 270 ml.), is run in so as to obtain a temperature of 40–50° C. The mixture is stirred at 60–65° C. for one hour, the residue separated by filtering and the solvent distilled off. The solidified residue is dissolved in 1 liter of acetone and the solution is poured into 4 liters of water with vigorous stirring to prevent the chloride from precipitating in clots. The mixture is filtered with suction, the filter cake washed until free from acid and the resulting N-chloromethylbenzazimide dried in air. M. P.: 124° C.; yield: 590–700 grams, i. e. 75–89% of the theoretical. By recrystallizing from 10 times the quantity of isopropyl alcohol the product is obtained in an entirely pure condition; M. P. 125° C.

PREPARATION C.—N-BROMOMETHYL-BENZAZIMIDE 53 grams of N-hydroxymethyl-benzazimide are suspended in 250 ml. of acetonitrile. 33.6 grams of phosphorus tribromide are added dropwise at 20–30° C. with cooling. After stirring at room temperature for one hour the mixture is poured into water, the reaction product filtered with suction and washed with water. The felted needles are crystallized from some methanol. M. P.: 126° C.; yield: 20 grams.

The following examples are given to illustrate the invention without in any way limiting the same.

Example 1

38 grams of O,O-dimethyldithiophosphoric acid are neutralized in 100 cc. of acetone and 5 cc. of water with 28 grams of sodium bicarbonate. At 25–30° C. 40 grams of N-chloromethylbenzazimide (M. P. 125° C.) dissolved in 400 cc. of acetone are added. After stirring at 50–60° C. for one hour the precipitated sodium chloride is separated by filtering and the solvent distilled. The remaining oil is taken up in benzene, washed first with sodium bicarbonate solution and then with water. After drying over sodium sulfate the solvent is distilled off. O,O-dimethyl-S-(benzaziminomethyl)-dithio-phosphate is left in the form of an oil and solidifies. After recrystallizing from methanol colorless crystals of the M. P. 72° C. are obtained. The yield amounts to 12 grams.

Example 2

100 grams of O,O-diethyldithiophosphoric acid are dissolved in 250 cc. of acetone and neutralized with 75 grams of sodium bicarbonate. At 25° C. a solution of 100 grams of N-chloromethylbenzazimide in 1000 cc. of acetone is added dropwise. The solution is stirred at room temperature overnight, the precipitated sodium chloride filtered off and the acetone distilled off. By adding water to the distillation residue the oil solidifies rapidly. The O,O-diethyl-S-(benzaziminoethyl)-dithiophosphate is recrystallized from little methanol. Colorless needles of the M. P.

49–50° C. are obtained. The yield amounts to 126 grams.

Example 3

44 grams of O,O-di-n-propyldithiophosphoric acid are neutralized in 100 cc. of acetone with 28 grams of sodium bicarbonate. At 30–35° C. 40 grams of N-chloromethyl-benzazimide dissolved in 400 cc. of acetone are added dropwise. After stirring at 40–50° C. for one hour the reaction product is poured into water, the precipitated oil taken up with benzene and worked up as described in Example 1. The O,O-di-n-propyl-S-(benzaziminomethyl)-dithiophosphate, which initially precipitates in the form of an oil, solidifies soon and is recrystallized from a small quantity of methanol. The yield amounts to 53%; M. P. 53° C.

In analogous manner O,O-diisopropyl-S-(benzazimino-methyl)-dithiophosphate is obtained in the form of colorless crystals of the M. P. 56° C.

Example 4

A solution of 20 grams of N-chloromethylbenzazimide in 200 cc. of methylethylketone is added at 50° C. dropwise to 24 grams of the ammonium salt of O,O-diethylthio-phosphoric acid in 100 cc. of methylethylketone. The solution is heated at 70–80° C. for two hours, the precipitated ammonium chloride is filtered off after cooling and the solvent distilled in vacuum. The remaining oil is taken up in benzene, washed with water and dried over sodium sulfate. After distilling off the solvent O,O-di-ethyl-S-(benzaziminomethyl)-thiolphosphate is obtained as a red-brown colored, non-distillable oil. The yield amounts to 21 grams.

Example 5

35 grams of the ammonium salt of O,O-di-n-propylthio-phosphoric acid are dissolved in 100 cc. of acetone. At 30–40° C. 20 grams of N-chloromethylbenzazimide dissolved in 200 cc. of acetone are added dropwise. After heating at 50–60° C. for two hours the solution is poured into water, the precipitated oil taken up in benzene and worked up as described in Example 4. O,O-di-n-propyl-S-(benzaziminomethyl)-thiolphosphate is obtained as a red-brown colored, non-distillable oil. The yield amounts to 22 grams.

Example 6

35 grams of the ammonium salt of O,O-diisopropylthio-phosphoric acid are dissolved in 100 cc. of acetone. At 30–40° C. a solution of 20 grams of N-chloromethylbenz-azimide in 200 cc. of acetone is added dropwise. After heating at 50–60° C. for two hours the solution is poured into water and the precipitated oil taken up in benzene, washed with water and dried over sodium sulfate. After distilling off the solvent, O,O-diisopropyl-S-(benzazimino-methyl)-thiolphosphate is obtained as an oil which solidifies soon. The yield amounts to 22 grams; M. P. 55° C.

Example 7

53 grams of N-hydroxymethylbenzazimide are suspended in 250 cc. of acetonitrile. 33.6 grams of phosphorus tribromide are added to the suspension dropwise at 20–25° C. with cooling. After stirring at room temperature for one hour the suspension is poured into water, the precipitated substance filtered with suction and washed with water. The N-bromomethylbenzazimide, which is precipitated in felted needles, is recrystallized from little methanol. The yield amounts to 20 grams; M. P. 126° C.

16 grams of O,O-diethyldithiophosphoric acid are dissolved in 100 cc. of acetone and neutralized with 12 grams of sodium bicarbonate. 19 grams of finely pulverized N-bromomethylbenzazimide are added to the solution with stirring. The temperature is kept at 25–30° C. by cooling at intervals. The solution is stirred at room temperature for some hours, the sodium bromide filtered off and the acetone distilled. By adding water to the distillation residue the oil solidifies soon. The O,O-diethyl-S-(benz-azimidomethyl)-dithiophosphate is recrystallized from little methanol. The yield amounts to 28 grams; M. P. 52° C.

This application is a continuation-in-part to my application Serial No. 411,025, filed February 17, 1954, now abandoned.

I claim:

1. A new chemical compound having the general formula

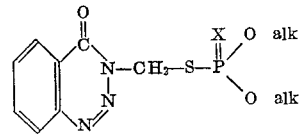

in which X is a member selected from the group consisting of oxygen and sulfur and alk is a lower alkyl group.

2. The compound having the formula

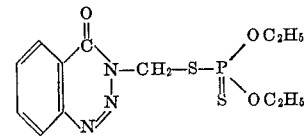

3. The compound having the formula

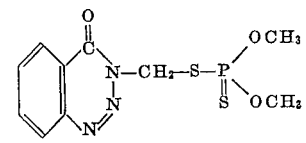

4. The compound having the formula

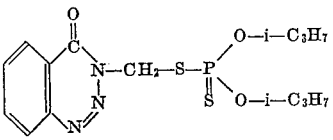

5. A process for the production of O,O-di-lower-alkyl-S-(benzazimidomethyl-) thiol- and -dithiophosphates which comprises reacting a halogenomethylbenzazimide with a salt of a member selected from the group consisting of O,O-di-lower-alkyl-thiol-phosphoric-acid and -dithio-phosphoric acid having the general formula

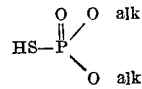

and

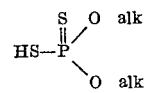

respectively and recovering a O,O-di-lower-alkyl-S-(benz-azimidomethyl-thiol and -dithiophosphate respectively from the reaction mixture.

6. Process in accordance with claim 5 in which said reaction is carried out in an inert diluent.

7. Process in accordance with claim 5 in which said reaction is started at room temperature and finished at slightly elevated temperatures.

No references cited.